(12) United States Patent
Sciti et al.

(10) Patent No.: US 11,180,418 B2
(45) Date of Patent: Nov. 23, 2021

(54) COMPOSITE MATERIAL BASED ON C/SIC FIBERS WITH ULTRA REFRACTORY, HIGH TENACITY AND ABLATION RESISTANT MATRIX

(71) Applicant: CONSIGLIO NAZIONALE DELLE RICERCHE, Rome (IT)

(72) Inventors: Diletta Sciti, Faenza (IT); Luca Zoli, Faenza (IT); Valentina Medri, Faenza (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 282 days.

(21) Appl. No.: 16/072,893

(22) PCT Filed: Jan. 26, 2017

(86) PCT No.: PCT/IB2017/050418
§ 371 (c)(1),
(2) Date: Jul. 26, 2018

(87) PCT Pub. No.: WO2017/130134
PCT Pub. Date: Aug. 3, 2017

(65) Prior Publication Data
US 2019/0062223 A1  Feb. 28, 2019

(30) Foreign Application Priority Data
Jan. 27, 2016   (IT) .................... 102016000008310

(51) Int. Cl.
*C04B 35/56*  (2006.01)
*C04B 35/626*  (2006.01)
(Continued)

(52) U.S. Cl.
CPC ...... *C04B 35/5607* (2013.01); *C04B 35/5622* (2013.01); *C04B 35/58064* (2013.01);
(Continued)

(58) Field of Classification Search
None
See application file for complete search history.

(56) References Cited

U.S. PATENT DOCUMENTS

| | | | |
|---|---|---|---|
| 8,409,491 B1 | 4/2013 | Stackpoole et al. | |
| 2013/0116109 A1* | 5/2013 | Ritti | C04B 35/803 501/95.2 |

(Continued)

FOREIGN PATENT DOCUMENTS

CN   102417375 B   8/2013

OTHER PUBLICATIONS

Monteverde et al. Advances in microstructure and mechanical properties of zirconium diboride based ceramics. Materials Science and Engineering A346 (2003) 310-319. (Year: 2003).*

(Continued)

*Primary Examiner* — Erin Snelting
(74) *Attorney, Agent, or Firm* — Silvia Salvadori, P.C.; Silvia Salvadori

(57) ABSTRACT

The present invention relates to a process for the production of fiber-reinforced composite materials with an ultra-refractory, high tenacity, high ablation resistant matrix with self-healing properties, prepared from highly sinterable slurries. The composite material is produced using techniques of infiltration and drying at ambient pressure or under vacuum, and consolidated by sintering with or without the application of gas or mechanical pressure.

11 Claims, 2 Drawing Sheets

(51) Int. Cl.
*C04B 35/634* (2006.01)
*C04B 35/645* (2006.01)
*C04B 35/66* (2006.01)
*C04B 35/58* (2006.01)
*C04B 35/80* (2006.01)
*F02K 9/97* (2006.01)
*F02K 9/60* (2006.01)
*C04B 35/628* (2006.01)
*C04B 35/63* (2006.01)

(52) U.S. Cl.
CPC .... *C04B 35/58078* (2013.01); *C04B 35/6261* (2013.01); *C04B 35/62655* (2013.01); *C04B 35/62863* (2013.01); *C04B 35/6303* (2013.01); *C04B 35/634* (2013.01); *C04B 35/645* (2013.01); *C04B 35/66* (2013.01); *C04B 35/80* (2013.01); *F02K 9/60* (2013.01); *F02K 9/97* (2013.01); *C04B 2235/3813* (2013.01); *C04B 2235/3826* (2013.01); *C04B 2235/3847* (2013.01); *C04B 2235/3873* (2013.01); *C04B 2235/3891* (2013.01); *C04B 2235/5244* (2013.01); *C04B 2235/5248* (2013.01); *C04B 2235/5252* (2013.01); *C04B 2235/5256* (2013.01); *C04B 2235/5264* (2013.01); *C04B 2235/5268* (2013.01); *C04B 2235/5436* (2013.01); *C04B 2235/5445* (2013.01); *C04B 2235/5454* (2013.01); *C04B 2235/5463* (2013.01); *C04B 2235/5472* (2013.01); *C04B 2235/606* (2013.01); *C04B 2235/616* (2013.01); *C04B 2235/6562* (2013.01); *C04B 2235/6567* (2013.01); *C04B 2235/666* (2013.01); *C04B 2235/77* (2013.01); *C04B 2235/80* (2013.01); *C04B 2235/96* (2013.01); *F05D 2300/2261* (2013.01); *F05D 2300/6033* (2013.01)

(56) References Cited

U.S. PATENT DOCUMENTS

2016/0083305 A1* 3/2016 Goetz ................ C04B 41/5096
501/88
2017/0334791 A1* 11/2017 Podgorski ................ B32B 5/30
2017/0369382 A1* 12/2017 Cabre .................... B29C 70/48

OTHER PUBLICATIONS

Sciti et al. From random chopped to oriented continuous SiC fibers-ZrB2 composites. Materials and Design 63 (2014) 464-470. (Year: 2014).*
Zhang et al. Mechanical properties of sintered ZrB2—SiC ceramics. Journal of the European Ceramic Society 31 (2011) 893-901. (Year: 2011).*
Medri V., et al. "Slip casting of ZrB2—SiC composite aqueous suspensions," Advanced Engineering Materials, vol. 12, No. 3, Mar. 1, 2010, pp. 210-215.
Rohm "Duramax(TM) D-3005 dispersant", Apr. 1, 1997 retrieved from the internet at http://www.dow.com/assets/attachments/business/pmat/duramax/duramax_d-3005/tds/duramax_d-3005/pdf.
Sciti D., et al., "Continuous C fibre composites with a porous ZrB2 matrix", Material & Design, vol. 85, Jun. 30, 2015, pp. 127-134.
Search Report and Written Opinion of PCT/IB2017/050418 dated May 3, 2017.
Wang Y., et al., "Preparation and properties of 2D C/ZrB2 SiC ultra-high temperature ceramic composites", Material Science and Engineering A: Structural Materials: Properties, Microstructures and Processing, vol. 524 No. 1-2, Oct. 25, 2009 pp. 129-133.
Zoli L., et al., "Efficacy of ZrB2 SiC matrix in protecting C fibres from oxidation in novel UHTCMC materials," Materials & Design vol. 113, Sep. 30, 2016, pp. 207-213.

* cited by examiner

COMPOSITE MATERIAL BASED ON C/SIC FIBERS WITH ULTRA REFRACTORY, HIGH TENACITY AND ABLATION RESISTANT MATRIX

This application is a U.S. national stage of PCT/II32017/050418 filed on 26 Jan. 2017 which claims priority to and the benefit of Italian Application No. 102016000008310 filed on 27 Jan. 2016, the content of which are incorporated herein by reference in their entireties.

The present invention relates to a process for the production of fiber-reinforced composite materials with an ultra-refractory, high tenacity, high ablation resistant matrix with self-healing properties, prepared from highly sinterable ceramic suspensions (slurries).

The composite material is produced using techniques of infiltration and ambient pressure to vacuum drying and consolidated by sintering with or without the application of gas or mechanical pressure.

STATE OF THE ART

In the aerospace industry, there is a growing demand for advanced materials capable of withstanding temperatures above 2000° C. in highly corrosive environments. Rocket nozzles and thermal protection systems for space vehicles that fly at hypersonic speeds must be capable of withstanding temperatures of up to 2300° C., flows of intense heat (from 1 to 10 MWm$^{-2}$) and extreme mechanical stresses at the time of launching and of re-entry into earth's atmosphere. The combination of extreme temperatures, rapid heating/cooling cycles and chemically aggressive environments are conditions that go beyond the capacity of traditional materials.

C/SiC and SiC/SiC composites are presently among the most promising materials for applications in these fields, for which the feasibility of the various parts of aeronautic engines, parts of valves for hot gases and thermal protection systems has already been demonstrated. Up to now, the materials for use in extreme environments such as the ones indicated above have largely been limited to ceramics based on silicon, which is capable of forming, by oxidation, a protective surface $SiO_2$ film.

However, although $SiO_2$ provides an excellent barrier to oxidation at temperatures below 1600° C. and in oxygen-rich atmospheres, beyond this temperature it begins to soften and in an oxygen-poor atmosphere it provokes a substantial formation of vapors. In particular, it has been observed, for solid-propellant propulsion systems, that ample fractions of the silicon-based phase are not acceptable. Furthermore, carbon fiber- or graphite-based materials are afflicted by severe erosion. If not controlled, the erosion can compromise the safety of space flights, for example due to an uncontrollable imbalance in the thrust when two boosters are ignited simultaneously.

For this reason, in recent years, ultra-refractory ceramic materials such as $ZrB_2$, $HfB_2$, ZrC, HfC and TaC have been broadly studied as innovative thermal protection systems, and, more in general, for applications in which resistance to oxidation and/or erosion at extreme temperatures is necessary. The category of ultra-refractory ceramic materials (UHTCs) comprises compounds with melting temperatures ranging from 3200° to 4000° C. and resistant to breakage even at high temperatures.

Very recently, UHTC inserts have been tested on scale prototypes of rocket engines, confirming that the high elastic modulus and high erosion resistance are extremely important properties for materials that must be used for these applications. However, these tests have confirmed the need for these materials also to have an exceptional resistance to thermal shocks. For example, thermal protection systems entirely based on non-reinforced UHTCs have systematically failed during re-entry tests due to the lack of resistance to thermal shocks and the zero tolerance to material damage.

One way to overcome the problems of the fragility of ultra-refractory ceramic materials is to supplement the ceramic phases with reinforcement elements, such as continuous fibers. Composite materials have been developed and tested which have been produced by infiltrating carbon preforms with suspensions (slurries) of various ultra-refractory ceramics. The majority of the processes developed employ chemical vapor infiltration (CVI) techniques, primarily with C vapors, in order to close open pores and favor the in situ formation of an SiC phase in the boride matrix. The densification of the material is generally carried out by means of repeated PIP (Polymer Infiltration and Pyrolysis) cycles. However, the infiltration and densification of the material by means of the processes seen above show some limits, including high costs and lengthy production times.

For this reason, hybrid methods for the production of UHTC composites have been developed, in particular with the use of $ZrB_2$-based matrices, which couple the technique of slurry infiltration with vacuum-bag of carbon fibers, typical of the production of polymer-matrix composite materials, with a sintering process typical of ceramic materials (D. Sciti et al., *Materials and Design*, 85 (2015) 127-134). This method permits the production of composites with a carbon fiber content of up to 70% and a quite good densification of the ultra-refractory matrix. However a residual porosity of the material compromises its performance at high temperatures.

An analogous hybrid method has been used for the production of UHTC composites with a $ZrB_2$-based matrix, reinforced with silicon carbide fibers (L. Zoli et al., *J Eur Ceram Soc* (2015), 35, 16, 4371-4376). The ultra-refractory composite materials obtained exhibit a residual porosity of less than 10% and an SiC fiber content of up to 50%; however, the incorrect design of the composition has failed to ensure adequate mechanical performances due to a strong reactivity between the fibers and matrix which limits the fiber pullout.

In this context, the technical task at the basis of the present invention is to propose an efficient process for the synthesis of ultra-refractory composite ceramic materials with high tenacity and flexural strength, as well as high ablation and erosion resistance, which can have application in the aerospace industry for the production of components subject to use in extreme conditions, in particular at extremely high temperatures.

A further object of the present invention is to provide ultra-refractory composite ceramic materials having improved characteristics of ablation and erosion resistance and endowed with a self-healing capacity.

SUMMARY OF THE INVENTION

The stated technical task and specified objects are substantially achieved by a process for the preparation of ultra-refractory composite ceramic materials comprising:
(i) preparing at least one preform comprising fibers selected from among carbon fibers, silicon carbide fibers and mixtures thereof;

(ii) infiltrating said at least one preform with a ceramic suspension comprising:
(a) a mixture of ceramic phases comprising:
≥70 vol. % of an ultra-refractory ceramic component selected from among $ZrB_2$, $HfB_2$, $TaB_2$, ZrC, HfC, TaC and mixtures thereof;
≤10 vol. %, preferably 3-8 vol. % of a sintering aid selected from among $ZrSi_2$, $Si_3N_4$ and mixtures thereof, preferably $Si_3N_4$; and
≤20 vol. %, preferably ≤10 vol. %, more preferably ≤5 vol. %, still more preferably 2-5 vol. %, of an Si compound selected from among SiC, at least one organic precursor of SiC, and mixtures thereof; and
(b) a dispersing medium selected from among water, at least one organic solvent and mixtures thereof,
thereby obtaining a composite material;
(iii) drying the composite material at a pressure less than or equal to about $1 \times 10^5$ Pa; and
(iv) consolidating the dried composite material at a temperature comprised in the range of 1700°–2000° C.

In a further aspect thereof, the present invention relates to an ultra-refractory composite ceramic material obtained or obtainable from the above-described process, as well as the use of said material for the production of articles intended for use in extreme conditions, in particular at temperatures greater than or equal to 1600° C.

The present invention will be described in detail below, also with the aid of the following figures. In particular, FIG. 1 shows an electron microscope image of the UHTC composite material obtained in Example 1. The image is a 2000× magnification of a cross section of the material relative to the direction of the 1D fibers of the preform;

DETAILED DESCRIPTION

Figure 1:
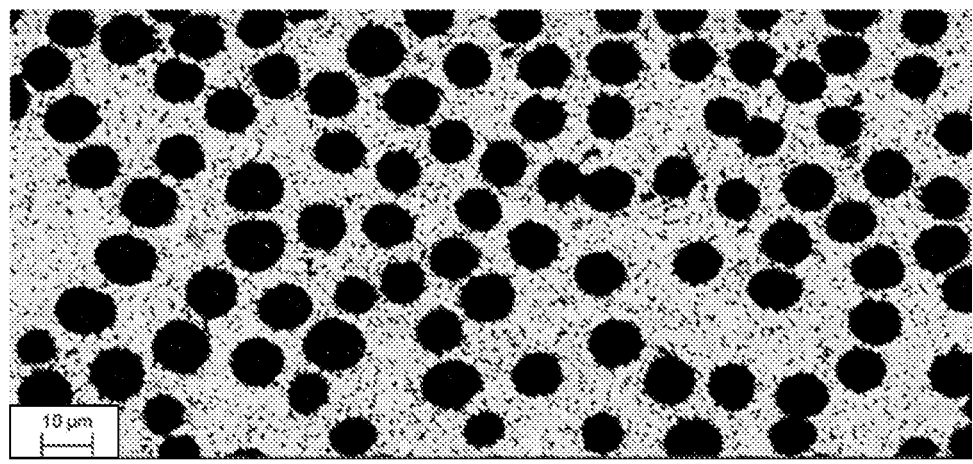

In the present description and in the appended claims, the term "preform" refers to an orderly (as if woven) or disorderly (or random) intertwining of fibers.

In the present description and in the appended claims the acronym "UHTC" (Ultra-High Temperature Ceramic) refers to ultra-refractory ceramic materials. Analogously, "UHTC composites" refers to ultra-refractory composite ceramic materials.

"Ceramic suspension" means a dispersion of solid particles in a liquid, stable at room temperature, for example at a temperature comprised between 15° and 35° C. In practice, the ceramic suspension appears as a homogeneous dispersion, without precipitates and non-sedimented.

In the present invention and in the appended claims the term "self-healing properties" refers to the material's properties of repairing any defects present in the material itself when the latter is subjected to high temperatures, typically to temperatures 1000° C. for a time of at least 1-10 min.

In a first aspect, the present invention relates to a process for the preparation of UHTC composites comprising:
(i) preparing at least one preform comprising fibers selected from among carbon fibers, silicon carbide fibers and mixtures thereof;
(ii) infiltrating said at least one preform with a ceramic suspension comprising:
(a) a mixture of ceramic phases comprising:
≥70 vol. % of an ultra-refractory ceramic component selected from among $ZrB_2$, $HfB_2$, $TaB_2$, ZrC, HfC, TaC and mixtures thereof;
≤10 vol. %, preferably 3-8 vol. % of a sintering aid selected from among $ZrSi_2$, $Si_3N_4$ and mixtures thereof, preferably $Si_3N_4$; and
≤20 vol. %, preferably ≤10 vol. %, more preferably ≤5 vol. %, still more preferably 2-5 vol. %, of an Si compound selected from among SiC, at least one organic precursor of SiC and mixtures thereof, preferably SiC; and
(b) a dispersing medium selected from among water, at least one organic solvent and mixtures thereof,
thereby obtaining a composite material;
(iii) drying the composite material at a pressure less than or equal to $1 \times 10^5$ Pa; and
(iv) consolidating the dried composite material at a temperature comprised in the range of 1700°–2000° C.

According to a first variant, the at least one preform can comprise fibers with a diameter of about 5-20 µm, preferably about 10 µm.

Preferably, the fibers can be carbon fibers. According to a further variant, the fibers can have a high modulus of elasticity, above 600 GPa, carbon fibers with a high modulus of elasticity being particularly preferred.

The preforms usable in the process according to the invention can be selected from among 1D unidirectional preforms (in which all the fibers are oriented in the same direction), random preforms (in which the fibers are randomly oriented), 2D preforms (i.e. woven with a weft and a warp), 2.5D preforms and 3D preforms (i.e. also braided on a vertical axis) and combinations thereof.

Preferably, the at least one preform used in the process of the present invention can be unidirectional.

More preferably, step (i) of the process according to the invention can be implemented by superimposing a plurality of unidirectional preforms in a 0-90° arrangement. Still more preferably, the superimposed layers can be held together by weaving along the vertical axis to limit delamination. In this manner one obtains a UHTC composite material of the desired thickness, generally ≥about 1 mm.

The dimensions (shape and thickness) of the at least one preform will depend on the dimensions of the UTHC composite it is desired to obtain. According to a further variant, the amount of fibers present in the UHTC composite can be comprised in the range of about 30-70 vol. %, preferably about 45-55 vol. %. This enables the UHTC composite material obtained from the process according to the invention to have a high flexural strength and high fracture tenacity.

Step (ii) of the process according to the invention comprises the infiltration of said at least one preform with a ceramic suspension comprising:
(a) a mixture of ceramic phases comprising:
≥70 vol. %, preferably ≥80 vol. %, more preferably 85-95 vol. %, of an ultra-refractory ceramic component selected from among $ZrB_2$, $HfB_2$, $TaB_2$, ZrC, HfC, TaC and mixtures thereof, preferably $ZrB_2$;
≤10 vol. %, preferably 3-8 vol. % of a sintering aid selected from among $ZrSi_2$, $Si_3N_4$ and mixtures thereof, preferably $Si_3N_4$; and
≤20 vol. %, preferably ≤10 vol. %, more preferably ≤5 vol. %, still more preferably 2-5 vol. %, of an Si compound selected from among SiC, at least one organic precursor of SiC and mixtures thereof, preferably SiC; and (b) a dispersing medium selected from among water, at least one organic solvent and mixtures thereof, preferably water.

In one embodiment, the ultra-refractory ceramic component used in step (ii) is a powder that can have particle size of about ≤5 µm, preferably comprised in the range of about 0.2-5 µm. In a preferred variant, about 70-90 vol. % of the particles of the ultra-refractory ceramic component can be comprised in the above-specified range and about 10-30 vol. % can have size of about ≤500 nm.

According to one variant, the mixture of ceramic phases can comprise SiC in powder, wherein said powder can have sub-micrometric dimensions, preferably of about ≤500 nm, more preferably comprised in the range of about 50-250 nm.

Alternatively, it is also possible to add to the mixture of ceramic phases at least one organic precursor of SiC, i.e. an organic Si compound capable of developing SiC during the subsequent steps of the process according to the invention. The at least one organic precursor of SiC can be selected from among polycarbosilanes, polysilazanes and mixtures thereof. According to a further preferred variant, the ceramic suspension can further comprise tungsten carbide. The presence of WC, in combination with SiC, imparts self-healing properties to the UHTC composite material obtained from the process according to the invention. The concentration of WC can be about ≤20 vol. %, preferably about ≤10 vol. %, more preferably it can be comprised in the range of about 2-5 vol. %.

In a further equally preferred variant, in order to optimize the rheological characteristics, the ceramic suspension can comprise at least one additive selected from among polycarboxylates, ammonium salts, polyalcohols having a molecular weight that can range between 500 and 16000 Da, and mixtures thereof. The overall amount of additive can be ≤10% by weight, preferably comprised in the range of 0.1-5% by weight.

The dispersing medium used for the preparation of the ceramic suspension can preferably be selected from among demineralized water (conductivity lower than 10 µS/cm), ketones, alcohols, ethers and mixtures thereof. More preferably, the dispersing medium is demineralized water.

In order to further optimize the rheology, the pH of the ceramic suspension can be adjusted by adding suitable pH adjusters, preferably selected from among organic and inorganic mono- or di-protic acids, ammonia and metal hydroxides.

The ceramic suspension of step (ii) of the process according to the invention can be prepared by premixing the powders in a ball mill using a volatile organic solvent, for example ethanol. The mixture can be homogenized for at least 24 hours and subsequently dried (for example in a rotary evaporator) and sieved. Subsequently, the powders can be suspended in water, optionally in the presence of further suitable components of the ceramic suspension as indicated above.

Alternatively, the solid component can be mixed with the water and optional additives in a ball mill for about 18-30 hours and the ceramic suspension used directly for impregnation.

In order to obtain an optimal infiltration of the preforms, the ceramic suspension can preferably have a viscosity comprised in the range of about 15-2200 cP, more preferably in the range of about 50-600 cP, at a shear rate comprised in the range of 1-10 s$^{-1}$.

Depending on the particle size distribution and density, the ceramic suspension can comprise high solid loads, preferably about 30-50 vol. % of a solid mixture of ceramic phases relative to the total volume of the suspension.

Step (ii) can be conducted by infiltrating the at least one preform with the ceramic suspension by means of known infiltration techniques, such as, for example, manual infiltration, or by sonication.

Subsequently, in step (iii) the composite material is dried at a pressure less than or equal to about $1 \times 10^5$ Pa, preferably under vacuum, more preferably using the vacuum-bag drying technique.

The term "vacuum" refers to a pressure comprised between about $1 \times 10^5$ Pa and about $1 \times 10^{-1}$ Pa.

According to one embodiment, during step (iii) the at least one preform can be maintained in the vacuum bag for a range of time necessary to remove almost the totality of the liquid, at a temperature of about 20°-80° C., applying a vacuum of ≤about 60 mmHg (about $8 \times 10^3$ Pa).

Steps (ii) and (iii) are typical of the processes of infiltration and drying of polymer-matrix composite materials, for example by manual infiltration of the ceramic suspension into the at least one preform, followed by the application of the vacuum bag.

During step (iv) of the process according to the invention, the composite material is consolidated at a temperature comprised between 1700° C. and 2000° C., preferably using a sintering process typical of non-composite ceramic materials, such as, for example, hot-pressing or spark plasma sintering.

According to one variant, the composite material can be subjected to at least one hot-pressing cycle, applying a pressure comprised between 20 and 40 MPa at a temperature comprised in the range of about 1700°-2000° C., preferably about 1850°–2000° C., more preferably about 1850°-1950° C. The hot-pressing can take place under vacuum or in an inert atmosphere, for example in the presence of Ar, to prevent the formation of surface oxides that would compromise the physical-mechanical characteristics of the UHTC composite material.

The process according to the invention enables UHTC composite materials to be obtained in a simple, fast and cost-effective manner if compared to the processes normally used in the art for the production of these materials, in which the preforms are infiltrated with the ultra-refractory matrix by chemical vapor infiltration (CVI) and subsequently densified by means of PIP cycles.

Moreover, thanks to the optimization of the properties and composition of the ceramic suspension, in particular with regard to viscosity, pH and solid load, the UHTC composite material obtainable from the process according to the invention displays particularly advantageous characteristics.

Thus, in a further aspect thereof, the present invention relates to an ultra-refractory composite ceramic material obtained or obtainable from the above-described process.

Said UHTC composite material can have a melting temperature above 3000° C., which enables it to be used under extreme temperature conditions.

Furthermore, the UHTC composite obtainable or obtained from the process according to the invention is characterized by at least one of the following properties:

extremely low porosity, preferably comprised in the range of 5-30 vol. %, preferably 5-15 vol. %, more preferably 5-10 vol. %. The low porosity of the materials reduces their fragility, above all during use in extreme temperature and pressure conditions; and/or high flexural strength, preferably in the range of 100-300 MPa; and/or a high elastic modulus, preferably comprised in the range of 100-200 GPa; and/or high tenacity, preferably comprised in the range of 5-10 MPa.

Moreover, by incorporating phases of WC into the matrix of the UHTC composite material, it is possible to favor the occurrence of chemical reactions which promote compacting of the impurities of any oxides that may be present during the exposure of the material itself to extreme conditions, thus favoring the spontaneous regeneration of the material (self-healing property).

In one embodiment thereof, the present invention therefore relates to a self-healing UHTC composite material, wherein said material can comprise 2-5 vol. % of WC and 2-5 vol. % of SiC.

The present invention further relates to the use of the above-described UHTC composite material for the production of articles for use in extreme conditions, in particular at high temperatures, for example greater than or equal to 1600° C., as well as articles for use in extreme conditions comprising said UHTC composite material, such as, for example, components for use in the aerospace industry.

The present invention is illustrated below by means of some examples that have a non-limiting illustrative purpose.

Measurement Methods Used

Particle size: by X-ray sedimentography; the particle size is expressed as an equivalent spherical diameter ($d_{50}$).

Dynamic viscosity: by rotational rheometry using a cone/plate geometry 4/40.

Porosity: by mercury intrusion porosimetry.

Flexural strength: 4-point method according to standard EN 843-1.

Elastic Modulus: resonance frequency method.

Tenacity: Chevron Notched Beam method in bending (EN 14425-3).

Oxidation/ablation resistance: Melting furnace 1800° C. Nannetti, mod. FC-0311281.

Test piece weight: Gibertini balance mod. PSS

Erosion test: the erosion rate is measured with an ablation test using an HVOF (high velocity oxy-fuel) torch and subjecting the material to a flame produced by a mixture of high-velocity gas containing methane, oxygen and air, under the following flow conditions:

total pressure: 6.9 bar;
mean temperature: 2500 K;
gas velocity: 2140 m/s (Mach number 2.2);
mass flow velocity: 27 g/s;
torch nozzle diameter: 11 mm;
sample distance from torch nozzle: 70 mm
duration of experiment: 30 s.

Materials

For the purpose of the examples that follow, the following ceramic materials were used: $ZrB_2$ particle size <6 μm, purity >95%, H.S. Starck; $Si_3N_4$ particle size <6 μm, purity >98%, H.S. Starck; SiC particle size <6 μm, purity >98%, H.S. Starck; WC Treibacher AG, Germany particle size <6 μm, purity >98%.

Example 1

A 30 g solid mixture having the following composition was prepared:
89 vol. % $ZrB_2$;
8 vol. % $Si_3N_4$;
3 vol. % SiC.

The ceramic suspension was prepared by mixing, in a ball mill, the solid raw materials with 8 g of water and 0.8 g of additive (synthetic polyelectrolyte with a molecular weight >5000 Da, supplied by Ceramco SpA) for 180 min. at 200 rpm.

The experimental set-up used to infiltrate the carbon fiber preforms consisted in a vacuum bag equipped with an oil vacuum pump and an ultrasonic bath.

Eight 10×10 cm² 1-D carbon fiber preforms (E >600 GPa, fiber diameter 10 μm) were infiltrated by sonication; superimposed with a 0/90° orientation and placed in the vacuum bag at room temperature for 20 hours.

The composite material was consolidated by means of 1 hot-pressing cycle at 1900° C. and a pressure of 40 MPa, with a heating ramp from 900° to 1900° C. in 1 hour, a dwell time of 10 min. and free cooling.

The results of the tests conducted on the UHTC composite material obtained are shown in Table 1. FIG. 1 shows an electron microscope image of the UHTC composite material obtained in example 1, in which the optimal infiltration of the preform by the ceramic matrix appears evident (homogeneous microstructure of the composite).

TABLE 1

|  | u.m. |  |
| --- | --- | --- |
| Porosity | % | 7 |
| Fiber volume | % | 41 |
| Flexural strength | MPa | 240 ± 40 |
| Tenacity | MPa m$^{0.5}$ | 6.4 ± 0.8 |

As a result of the erosion test, the throat of the nozzle produced in the material obtained in example 1 did not undergo any appreciable erosion following exposure to the gas flow.

Example 2 (for Comparison)

A 30 g solid silicon carbide-free mixture having the following composition was prepared:
92 vol. % $ZrB_2$;
8 vol. % $Si_3N_4$;

The ceramic suspension was prepared according to the procedure in the example 1. Eight 10×10 cm² 1-D carbon fiber preforms (E >600 GPa, fiber diameter 10 μm) were infiltrated by sonication, superimposed with a 0/90° orientation and placed in the vacuum bag at room temperature for 20 hours.

Figure 2:
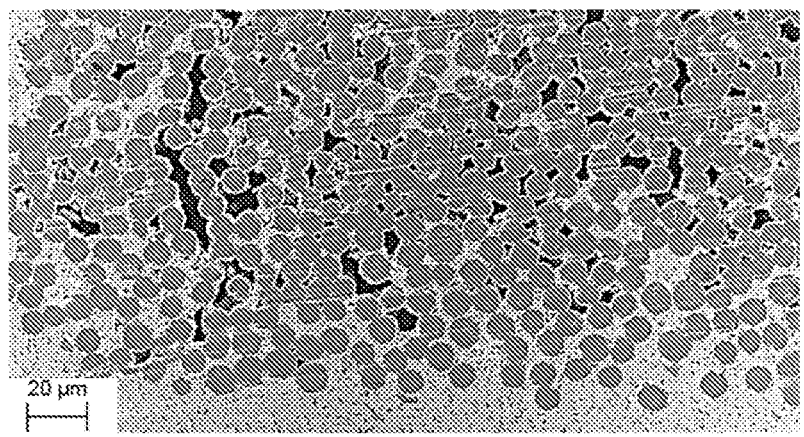
FIG. 2 shows an electron microscope image of the composite material obtained in the comparative Example 2. The image is a 990× magnification of a cross section of the material relative to the direction of the 1D fibers of the preform.

The composite material was consolidated by means of 1 hot-pressing cycle at 1900° C. and a pressure of 40 MPa, with a heating ramp from 900° to 1900° C. in 1 hour, a dwell time of 10 min. and free cooling. The results of the tests conducted on the UHTC composite material obtained are shown in Table 2. FIG. 2 shows an electron microscope image of the composite material obtained, which evidences the non-optimal infiltration of the fibers, poor densification and high porosity of the material.

TABLE 2

|  | u.m. |  |
| --- | --- | --- |
| Porosity | % | 16 |
| Fiber volume | % | 65 |
| Flexural strength | MPa | 140 ± 33 |
| Tenacity | MPa m$^{0.5}$ | 7.5 ± 1.4 |

Example 3

The material of example 1 was oxidized in air at 1400° C. for 6 h. Before and after the heat treatment, the sample was weighed and sectioned so as to observe any degradation of the microstructure. The sample did not undergo any significant weight loss as a result of the heat treatment and the polished section appears oxidized but intact.

Figure 3:
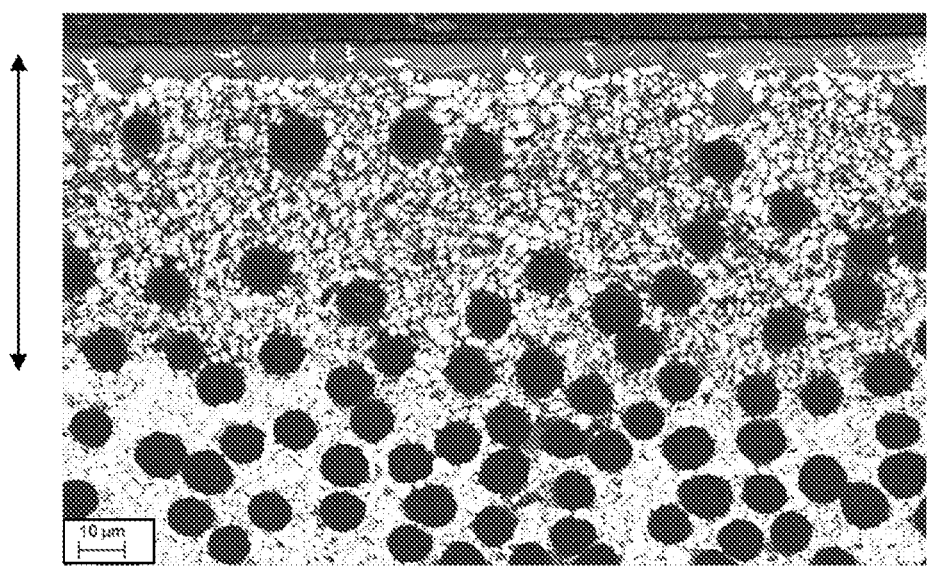
FIG. 3 shows a 2000× electron microscope image of the polished section of the UHTC composite material of Example 1 oxidized in air at 1400° C. for 6 h.

In FIG. 3 one observes a loss of fibers in the region closest to the surface of the sample exposed to the treatment, which is however compensated for by the capacity of the material to heal itself by generating a compact layer of protective material. The arrow indicates the self-healing layer generated by the sample.

Examples 4 and 5 and Example 6, for Comparison

Three rectangular-shaped test pieces of UHTC composite materials were prepared with the same dimensions as per the procedure described in example 1. The test pieces were obtained from a mixture of ceramic phases having the following compositions.

| Example 4 | Example 5 | Example 6 (comparison) |
|---|---|---|
| 89 vol. % $ZrB_2$ | 84 vol. % $ZrB_2$ | 92 vol. % $ZrB_2$ |
| 8 vol. % $Si_3N_4$ | 8 vol. % $Si_3N_4$ | 8 vol. % $Si_3N_4$ |
| 3 vol. % SiC | 3 vol. % SiC | / |
| / | 5 vol. % WC | / |

The test pieces were carefully washed, dried and weighed with a precision balance in order to determine the initial weight and measured to determine the exposed surface. The test pieces were then subjected to two consecutive oxidation cycles in a pit furnace at 1500° C. and 1650° C., each cycle lasting 2 minutes.

After the test the test pieces were once again weighed and a calculation was made of the difference in weight (DW) normalized relative to exposed surface S as DW/S.

TABLE 3

| | DW/S | Example 4 | Example 5 | Example 6 (comparison) |
|---|---|---|---|---|
| Self-healing phase | | SiC | SiC + WC | / |
| 1,500° C. | mg/cm$^2$ | −1.9 | −0.6 | −18.0 |
| 1,650° C. | mg/cm$^2$ | −3.6 | −0.6 | Excessively fragmented sample |

The results show that the sample without SiC and WC (comparative example 6) undergoes a high weight loss due to the inability of the ceramic matrix to protect the fibers from ablation. At 1650° C. the integrity of the material is greatly compromised, make determining its weight impossible. This is due both to the high porosity of the material and the absence of self-healing phases. The sample containing SiC and WC is the one that undergoes the least weight loss thanks to its better self-healing capacity.

The invention claimed is:

1. A process for the preparation of an ultra-refractory composite ceramic material comprising:
   (i) preparing at least one preform comprising carbon fibers;
   (ii) infiltrating the at least one preform with a ceramic suspension comprising:
      (a) a mixture of ceramic phases comprising:
         >70 vol. % of an ultra-refractory ceramic component selected from among $ZrB_2$, $HfB_2$, $TaB_2$, ZrC, HfC, TaC and mixtures thereof;
         3-8 vol. %, of a sintering aid selected from $ZrSi_2$, $Si_3N_4$ and mixtures thereof; and
         2-5 vol. %, of a Si compound selected from SiC, at least one organic precursor of SiC and mixtures thereof; and
      (b) a dispersing medium selected from water, at least one organic solvent and mixtures thereof, thereby obtaining a composite material;
   (iii) drying the composite material at a pressure less than $1 \times 10^5$ Pa; and
   (iv) consolidating the dried composite material at a temperature comprised in the range of 1700°-2000° C.,
      wherein the carbon fibers are present in the ultra-refractory composite ceramic material in an amount comprised in the range of 30-70 vol. %.

2. The process according to claim 1, wherein the mixture of ceramic phases comprises $ZrB_2$.

3. The process according to claim 1, wherein the ultra-refractory ceramic component of step (ii) is a powder having a particle size <5 μm.

4. The process according to claim 3, wherein 70-90 vol. % of the particles of the ultra-refractory ceramic component has size <5.0 μm, and 10-30 vol. % of the particles has size <500 nm.

5. The process according to claim 1, wherein the mixture of ceramic phases comprises SiC having particle size <500 nm.

6. The process according to claim 1, wherein the ceramic suspension further comprises <20 vol. % of WC.

7. The process according to claim 1, wherein the ceramic suspension further comprises at least one additive selected from polycarboxylates, ammonium salts, polyalcohols having molecular weight ranging from 500 to 16000 Da and mixtures thereof.

8. The process according to claim 1, wherein the ceramic suspension has a viscosity of 15-2200 cP at a shear rate comprised in the range of 1-10 s−1.

9. The process according to claim 1, wherein the consolidation of the composite material in step (iv) is carried out by hot-pressing at a pressure of 20-40 MPa and a temperature of 1700°-2000° C.

10. The process according to claim 1, wherein the ceramic suspension comprises 30-50 vol. % of a solid mixture of ceramic phases relative to the total volume of the suspension.

11. The process according to claim 1, wherein the ceramic suspension further comprises 2-5 vol. % of WC.

* * * * *